United States Patent [19]

Yamauchi

[11] Patent Number: 5,242,209
[45] Date of Patent: Sep. 7, 1993

[54] VEHICLE SIDE BODY STRUCTURE

[75] Inventor: Makoto Yamauchi, Hiroshima, Japan

[73] Assignee: Mazda Motor Corporation, Hiroshima, Japan

[21] Appl. No.: 913,925

[22] Filed: Jul. 17, 1992

[30] Foreign Application Priority Data

Jul. 19, 1991 [JP] Japan .................. 3-056417[U]

[51] Int. Cl.⁵ .................................... B62D 25/20
[52] U.S. Cl. .................... 296/188; 296/203; 296/209
[58] Field of Search ............... 296/203, 188, 209, 206

[56] References Cited

U.S. PATENT DOCUMENTS

| | | | |
|---|---|---|---|
| 3,528,699 | 9/1970 | Wessells, III | 296/209 |
| 4,471,992 | 9/1984 | Matsuura | 296/209 |
| 5,042,872 | 8/1991 | Yoshii | 296/203 |

FOREIGN PATENT DOCUMENTS 61-41083  3/1986 Japan .
1-169376  7/1986 Japan .
1-269679 10/1989 Japan .

*Primary Examiner*—Robert R. Song
*Attorney, Agent, or Firm*—Keck, Mahin & Cate

[57] ABSTRACT

A side body structure of an automotive vehicle includes a center pillar extending vertically substantially at a center portion of the side body and a side sill constituted by a side sill inner panel and a side sill outer panel. The side body structure comprises a member provided longitudinally at a side and lower portion of the vehicle and including the side sill inner panel so as to form a closed cross section, and a cross member provided transversely at a lower portion of the vehicle and connected with the closed cross section member.

7 Claims, 3 Drawing Sheets

VEHICLE SIDE BODY STRUCTURE

BACKGROUND OF THE INVENTION

1. Field of the Invention

The present invention relates to a side body structure of an automotive vehicle, in particular to an improvement of a side body structure in the vicinity of a side sill of the vehicle.

2. Description of the Related Art

A conventional side body structure of an automotive vehicle is disclosed in, for example, Japanese Utility Model Laid-Open No. 61-41083. In the disclosed structure, a center pillar reinforcement is disposed inside of a center pillar outer panel and both the center pillar reinforcement and the center pillar outer panel are connected at lower end portions thereof with a side sill so as to increase the rigidity of the vehicle body.

Japanese Patent Laid-Open No. 01-269679 discloses a side body structure of an automotive vehicle where a cross member disposed transeversely is connected with a side sill so as to increase rigidity of the vhicle body.

However the structures disclosed in Japanese Utility Model Laid-Open No. 61-41083 and Japanese Patent Laid-Open No. 01-269679 are still disadvantageous. Namely, it is necessary to reliably prevent the side sill from deforming toward the inside of the vehicle body when the vehicle receives a large lateral load on the side body such as during a collision. The prior art arrangements are unable to satisfy this need. It is therefore still necesarry to provide a side body structure of an automotive vehicle which has sufficient rigidity of the vhicle body.

SUMMARY OF THE INVENTION

It is therefore an object of the present invention to provide a side body structure of an automotive vehicle which has sufficient strength against larges load applied thereto.

It is another object of the present invention to provide a side body structure of an automotive vehicle which can reliably prevent the side sill from deforming toward the inside of the vehicle body when the vehicle receives a large lateral load on the side body such as during a collision.

The above and other object of the present invention can be accomplished by a side body structure of an automotive vehicle including a center pillar extending vertically substantially at a center portion of the side body and a side sill constituted by a side sill inner panel and a side sill outer panel, said side body structure comprising, a member provided longitudinally at a side and lower portion of the vehicle and including the side sill inner panel so as to form a closed cross section, and a cross member provided transversely at a lower portion of the vehicle and connected with the closed cross section member.

In one preferred embodiment, said side body structure further comprises a center pillar reinforcement extending along an inner side of the center pillar, said closed cross section member being constituted by the side sill inner panel and a lower portion of the center pillar reinforcement.

In another preferred embodiment, said side body structure further comprises a side sill outer panel reinforcement between the side sill inner panel and the side sill outer panel, said closed cross section member being constituted by the side sill inner panel and the side sill outer panel reinforcement.

In another preferred embodiment, said side body structure further comprises a center pillar reinforcement extending along an inner side of the center pillar, said closed cross section member being connected with a lower portion of the center pillar reinforcement.

In another preferred embodiment, said closed cross section member is constructed so that a cross-sectional area thereof decreases gradually toward a connecting portion with the cross member.

In another preferred embodiment, said closed cross section member is connected at a rear portion thereof with the cross member.

DESCRIPTION OF THE PREFERRED EMBODIMENTS

Figure 1:
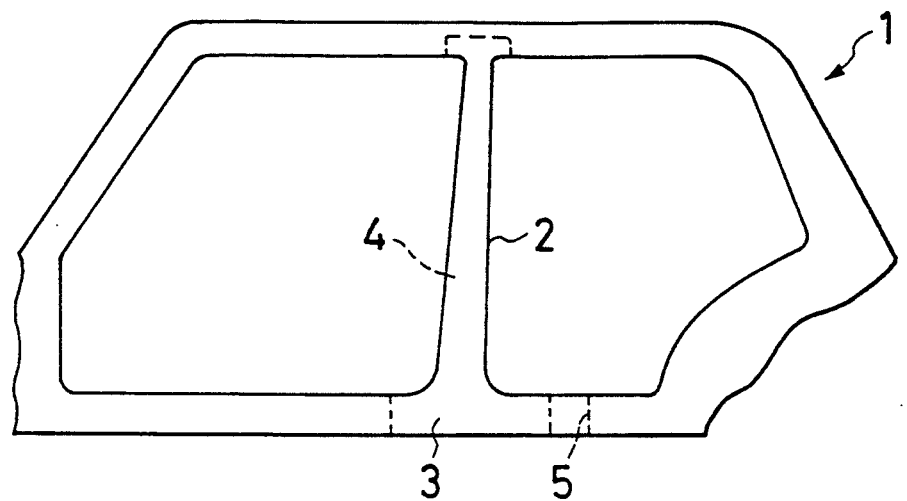
FIG. 1 is a schematic front view of a side body structure of an automotive vehicle according to an embodiment of the present invention.

Now referring to the drawings, there is shown in FIG. 1 a schematic front view of a side body structure of an automotive vehicle according to an embodiment of the present invention. Hereinafter, a description will be made with regard to only one side of the vehicle, it being understood that the other side is similarly constructed. Reference numeral 1 indicates a side body structure 1 of a four-door vehicle. The side body structure 1 is provided with a center pillar 2, a side sill 3 and the like. A center pillar reinforcement 4 is disposed in the center pillar 2 so as to extend to and connect with the side sill 3 at a lower end portion thereof. The side body structure 1 is further provide with a member 7 ( FIG. 3 ) which is constituted by the side sill 3 and the center pillar reinforcement 4 so as to form a closed cross section structure and to extend longitudinally at a lower and side portion of the vehicle. The closed cross section member 7 is connected with a cross member 5 extending transversely at a lower portion of the vehicle.

Next, referring to FIGS. 2 through 4, the embodiment of the present invention will be described in detail.

Figure 2:
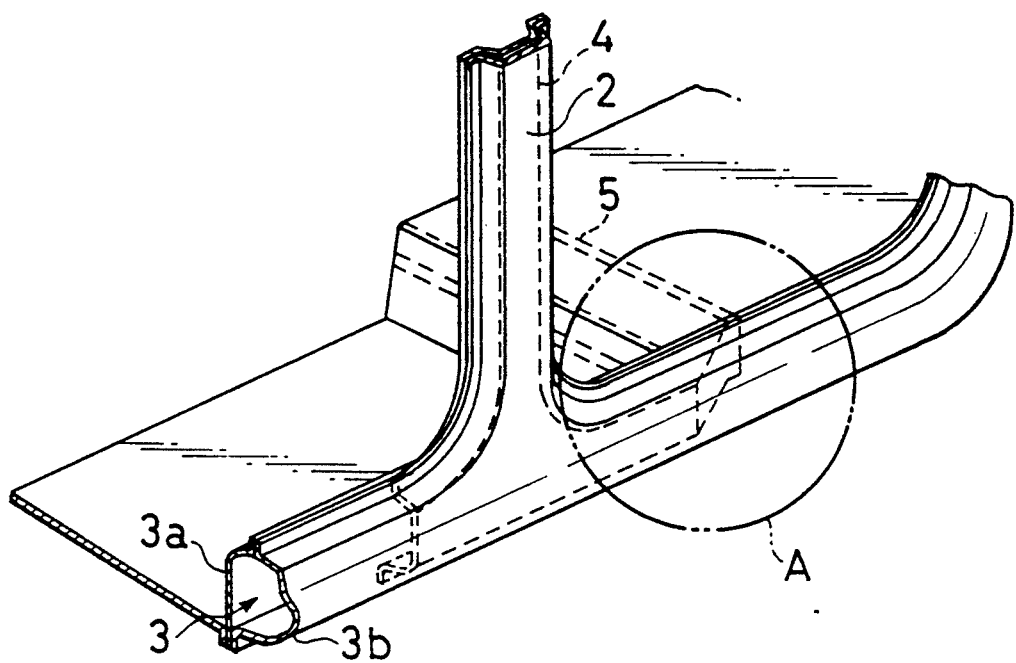
FIG. 2 is a perspective view which is partly broken away to show a portion of the side body structure of the automotive vehicle of FIG. 1.

As shown in FIG. 2, the center pillar reinforcement 4 is disposed in the center pillar 2 so as to extend vertically substantially at a center portion of the side body of the vehicle. The side sill 3 extends longitudinally at a lower portion of the side body of the vehicle and is constituted by a side sill inner panel 3a and a side sill outer panel 3b. The center pillar 2 is connected integrally at the lower portion thereof with the side sill outer panel 3b. The center pillar 2 and the center pillar reinforcement 4 are connected at respective lower portions thereof with the side sill inner panel 3a.

Figure 3:
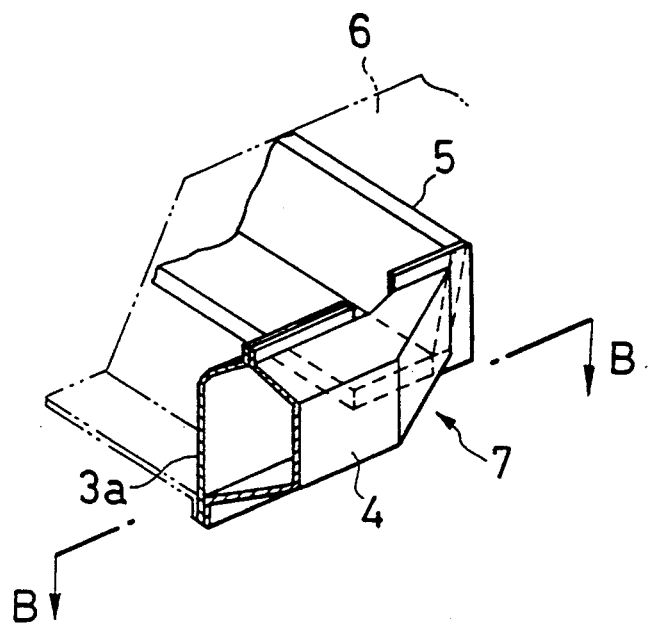
FIG. 3 is an enlarged partial view showing the portion indicated by A in FIG. 2.
Figure 4:
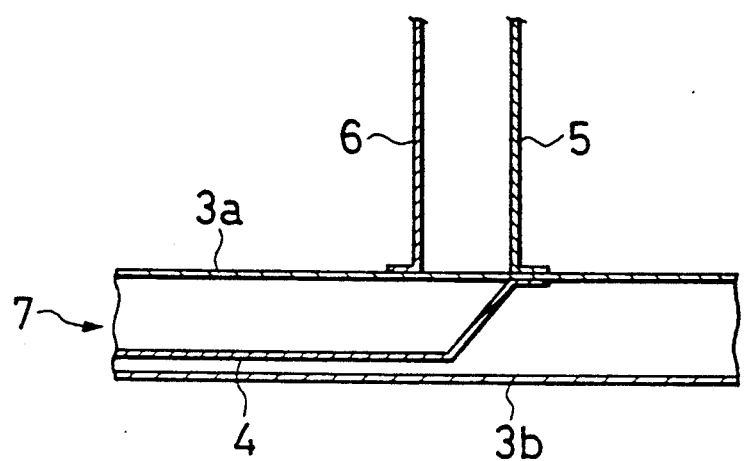
FIG. 4 is a sectional view taken along a line B—B in FIG. 3.

As shown in FIG. 3, the cross member 5 is provided transversely below a floor 6 of the vehicle. The side sill inner panel 3a and the lower portion of the center pillar reinforcement 4 constitute the closed cross section member 7 extending longitudinally at the lower and side portion of the vehicle. The closed cross section member 7 is connected at a rear end portion thereof with the cross member 5. The rear end portion of the closed cross section member 7 is constructed so that its cross-sectional area decreases gradually toward the connecting portion to the cross member 5.

Figure 5:
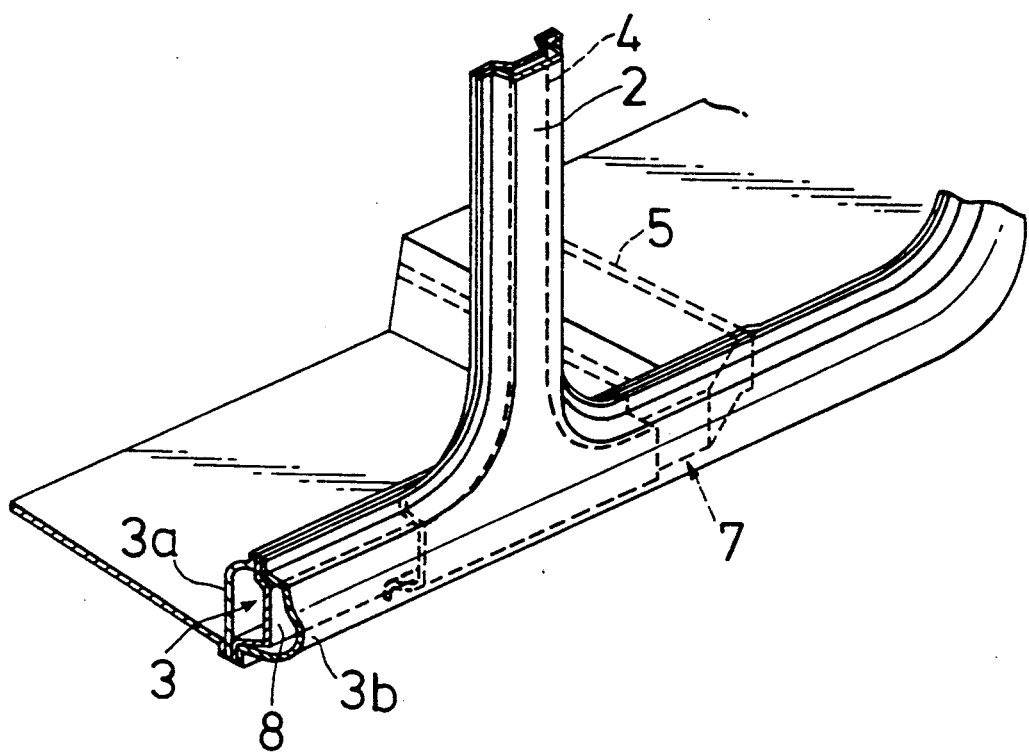
FIG. 5 is a perspective view showing a side body structure of an automotive vehicle according to another embodiment of the present invention.

FIG. 5 is a perspective view showing a side body structure of an automotive vehicle according to another embodiment of the present invention.

In this embodiment, the closed cross section member 7 is constructed by further porviding the side body structure 1 of the vehicle with a side sill outer panel reinforcement 8 located between the side sill inner panel 3a and the side sill outer panel 3b. The closed cross section member 7 is constituted by the side sill inner panel 3a and the side sill outer panel reinforcement 8. Further, the center pillar reinforcement 4 is connected integrally at the lower portion thereof with the side sill outer panel reinforcement 8. Similarly, the closed cross section member 7 is connected at the rear end portion thereof with the cross member 5, and the rear end portion of the closed cross section member 7 is constructed so that a cross-sectional area of the member 7 decreases gradually toward the connection portion to the cross member 5.

A cross member reinforcement ( not shown ) can further be disposed to extend along the cross member 5. In addition, the closed cross section member 7 may be connected at the rear end portion thereof with both of the cross member 5 and the cross member reinforcement.

According to the above mentioned embodiments of the present invention, the side sill 3 can be constituted to have high rigidity, since the side body structure 1 of the vehicle is provided with the closed cross section member 7 extending longitudinally at the lower and side portions of the vehicle.

Not only does the side sill 3 have high rigidity but the closed cross section member 7 is connected at the rear end portion thereof with the cross member 5 and, therefore, deformation of the side sill 3 toward the inside of the vehicle body when the vehicle receives a large lateral load on the side body such as during a collision can be prevented with high reliability.

Further, since the cross-sectional area of the closed cross section member 7 decreases gradually toward the connecting portion with the cross member 5, the connecting portion of the closed cross section member and the cross member 5 has high rigidity and, therefore, is able to prevent the side sill 3 from deforming toward the inside of the vehicle body.

The present invention has been described with reference to the preferred embodiments thereof which are intended to be illustrative rather than limiting. Various changes and modifications may be made without departing from the spirit and scope of the present invention as defined in the following claims.

What is claimed is:

1. A side body structure of an automotive vehicle including a center pillar extending vertically substantially at a center portion of the side body and a side sill constituted by a side sill inner panel and side sill outer panel, said side body structure comprising:

a member provided longitudinally at a side and lower portion of the vehicle and including said side sill inner panel so as to form a closed cross section;

a center pillar reinforcement extending along an inner side of said center pillar, said closed cross section member being constituted by said side sill inner panel and lower portion of said center pillar reinforcement; and a cross member provided transversely at a lower portion of the vehicle and connected with said closed cross section member.

2. A side body structure of an automotive vehicle including a center pillar extending vertically substantially at a center portion of the side body and a side sill constituted by a side sill inner panel and side sill outer panel, said side body structure comprising:

a member provided longitudinally at a side and lower portion of the vehicle and including said side sill inner panel so as to form a closed cross section;

a side sill outer panel reinforcement between said side sill inner panel and said side sill outer panel, said closed cross section member being constituted by said side sill inner panel and said side sill outer panel reinforcement; and a cross member provided transversely at a lower portion of the vehicle and connected with said closed cross section member.

3. A side body structure in accordance with claim 2 wherein said side body structure further comprises a center pillar reinforcement extending along an inner side of said center pillar, said closed cross section member being connected with a lower portion of said center pillar reinforcement.

4. A side body structure in accordance with claim 1 wherein said closed cross section member is constructed so that a cross-sectional area thereof decreases gradually toward a connecting portion with said cross member.

5. A side body structure in accordance with claim 2 wherein said closed cross section member is constructed so that a cross-sectional area thereof decreases gradually toward a connecting portion with said cross member.

6. A side body structure in accordance with claim 1 wherein said closed cross section member is connected at a rear portion thereof with said cross member.

7. A side body structure in accordance with claim 2 wherein said closed cross section member is connected at a rear portion thereof with said cross member.

* * * * *